(12) United States Patent
Zhou et al.

(10) Patent No.: US 6,590,791 B1
(45) Date of Patent: Jul. 8, 2003

(54) HIGH INPUT VOLTAGE, HIGH EFFICIENCY, FAST TRANSIENT VOLTAGE REGULATOR MODULE (VRM)

(75) Inventors: Xunwei Zhou, Fremont, CA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/434,514

(22) Filed: Nov. 5, 1999

Related U.S. Application Data
(60) Provisional application No. 60/107,433, filed on Nov. 6, 1998.

(51) Int. Cl.[7] ............................................. H02M 3/335
(52) U.S. Cl. ............................ 363/25; 363/16; 363/134
(58) Field of Search .......................... 363/15, 16, 24, 363/25, 97, 127, 131, 81, 89, 134

(56) References Cited

U.S. PATENT DOCUMENTS
5,907,479 A * 5/1999 Leu .............................. 363/131

* cited by examiner

Primary Examiner—Adolf Deneke Berhane
Assistant Examiner—Gary L. Laxton
(74) Attorney, Agent, or Firm—Whitham, Curtis & Christofferson, P.C.

(57) ABSTRACT

A high input-voltage push-pull forward voltage regulator module (VRM) has high efficiency and fast transient response. The VRM has a primary side wherein two switches and two primary transformer windings are alternately connected in a loop. A capacitor is connected between any of two interleaved terminations. The remaining two terminations are connected to input and ground respectively. The two primary transformer windings have the same number of turns. A number of secondary sides may be used such as, for example, a half wave rectifier or a center tapped secondary. The high input-voltage push-pull forward VRM has high efficiency and fast transient-response with reduced filter capacitance and inductance. Its magnetic components can be easily integrated. As a result, very high power density can be achieved. The device die size needed to achieve the required efficiency is reduced. And control is simple. Therefore, this topology is very cost effective.

11 Claims, 7 Drawing Sheets

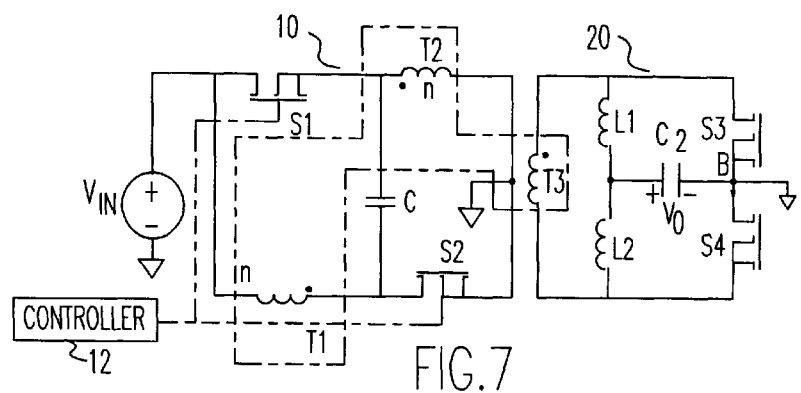
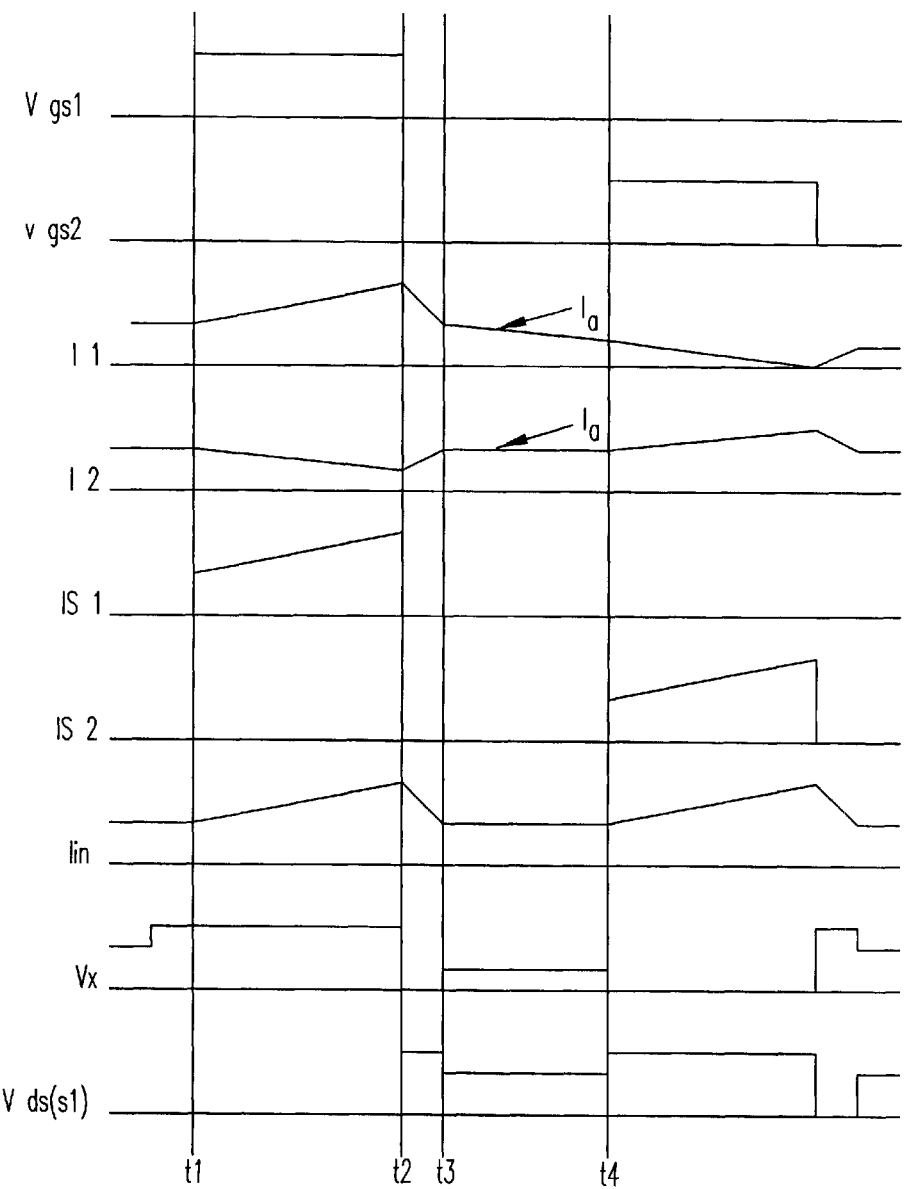

US 6,590,791 B1

HIGH INPUT VOLTAGE, HIGH EFFICIENCY, FAST TRANSIENT VOLTAGE REGULATOR MODULE (VRM)

CROSS REFERENCE TO RELATED APPLICATIONS

This application claims priority to provisional application Ser. No. 60/107,433, filed on Nov. 6, 1998, the contents of which are herein incorporated by reference.

BACKGROUND OF THE INVENTION

1. Field of the Invention

The present invention generally relates to a high input voltage, high efficiency, fast transient voltage regulator module and, more particularly, to a push-pull forward converter for driving low voltage, high current loads such as computer microprocessors.

2. Description of the Prior Art

Voltage regulator modules (VRMs) are used for a variety of purposes, such as, for example, to provide power to microcomputer processors or other low voltage, high current loads. Today's high input VRM topologies, with or without isolation, have low efficiency or slow transient response. If the high input-voltage VRMs don't have an isolation transformer to adjust their duty cycle their efficiency is very low, like the synchronous rectifier buck converter. Although some high input-voltage VRMs have isolation transformers to adjust duty cycle, like forward and flyback VRMs, their efficiency is lower than that of the proposed topology. Other high input-voltage isolated VRM topologies, like flyback forward and asymmetrical half bridge VRMs, have suitable efficiency, but their transient response is very slow.

FIGS. 1, 2, 3, 4, 5 and 6 show prior art high input-voltage VRM topologies. FIG. 1 shows the synchronous rectifier buck converter. For this kind of converter, when the input voltage is high, its duty cycle is very small. As a result, converter efficiency is low and large output filter is needed for asymmetrical transient response. The gate signals of the two MOSFETs, Q1 and Q2, in the synchronous rectifier (SR) buck is complementary. The operation of buck converter is like that of a conventional buck. That is, it converts a high DC voltage from input Vin to a low DC voltage Vo at the load.

FIG. 2 shows a flyback converter. It has a transformer T to adjust duty cycle. In operation, when switch Q1 turns on, the energy is stored in the magnetizing inductor by primary winding. At the same time, the secondary diode Q2 is blocked. After Q1 turns off, the energy stored in the magnetizing inductor is transferred to output load through secondary winding and diode Q2. As a result, the energy is transferred from high DC input voltage source Vin to low DC output Vo at the load. However, this flyback converter has a leakage inductance which causes large voltage spike. This requires a high voltage rating device to be used in the converter. On the other hand, its output current is discontinuous. Therefore, larger output filter is needed.

FIG. 3 shows active clamp forward with synchronous rectifier. When switch Q1 turns on, the energy is transferred from high DC input voltage source Vin to low DC output voltage Vo to a load through transformer and switch Q4. After Q1 turns off, Q4 turns off, then Q2 and Q3 turn on. The magnetizing current is discharged by Cd. And the output inductor current is continued by Q3. This converter has higher efficiency than that of the flyback converter. When there is tight transient response requirement, small inductance is required. Under this condition, its efficiency is reduced and its output filter is large.

FIG. 4 shows a push pull converter with center tapped secondary. The gate signals of the two primary switches Q1 and Q2 are symmetrical and out of the phase (180 degrees difference). When switch Q1 turns on, the energy is transferred from high DC input voltage source Vin to low DC output voltage Vo at the load through transformer and switch Q4. The duty cycle of Q1 is limited to be smaller than 50%. After Q1 turns off, Q4 turns off. After 180 degrees from the turn on point of Q1, Q2 and Q3 turn on. The duty cycle of Q2 is smaller than 50%. Like the flyback converter, the transformer leakage inductance induces large voltage spike. Converter efficiency is limited.

FIG. 5 shows an asymmetrical half bridge converter with a current doubler secondary. The gate signals of the two primary switches Q1 and Q2 are complementary. When switch Q1 turns on, the energy is transferred from high DC input voltage source Vin to low DC output voltage Vo to a load through transformer and switch Q4. The duty cycle of Q1 is limited to be smaller than 50%. After Q1 turns off, Q4 turns off, then Q2 and Q3 turn on. The converter efficiency depends on the input voltage. When it transformer turns ratio is low, its efficiency is reduced. And it is a fourth-order system. Its transient is slow.

FIG. 6 shows a flyback forward converter. The gate signals of the two primary switches Q1 and Q2 are complementary. When switch Q1 turns on, the energy is transferred from high DC input voltage source to low DC output voltage load (between A and B) through transformer and switch Q4. After Q1 turns off, Q4 turns off, then Q2 and Q3 turn on. Cd through Q2 discharges the magnetizing current. Like the asymmetrical half bridge, it is a fourth-order system. Large output filter is needed. Control design is complicated.

SUMMARY OF THE INVENTION

It is therefore an object of the present invention to provide a VRM push-pull forward topology having high efficiency and fast transient response.

According to the invention a VRM has a primary side wherein the two switches and two primary transformer windings are alternately connected in a loop. A capacitor is connected between any of two interleaved terminations. The remaining two terminations are connected to input and ground respectively. The two primary transformer windings have the same number of turns. A number of secondary sides may be used such as, for example, a half wave rectifier or a center tapped secondary.

The novel high input-voltage push-pull forward VRM has high efficiency and fast transient response. Compared with conventional high input-voltage VRMs, its filter capacitance and inductance can be reduced 2–4 times. Its magnetic components can be easily integrated. As a result, very high power density can be achieved. Also, compared with conventional VRMs, its efficiency is high. The device die size needed to achieve the required efficiency is reduced. And control is simple. Therefore, this topology is very cost effective.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a circuit diagram of a push pull forward converter according to the present invention;

FIG. 8 is a timing diagram of the push pull forward converter shown in FIG. 7;

DETAILED DESCRIPTION OF A PREFERRED EMBODIMENT OF THE INVENTION

Figure 1:
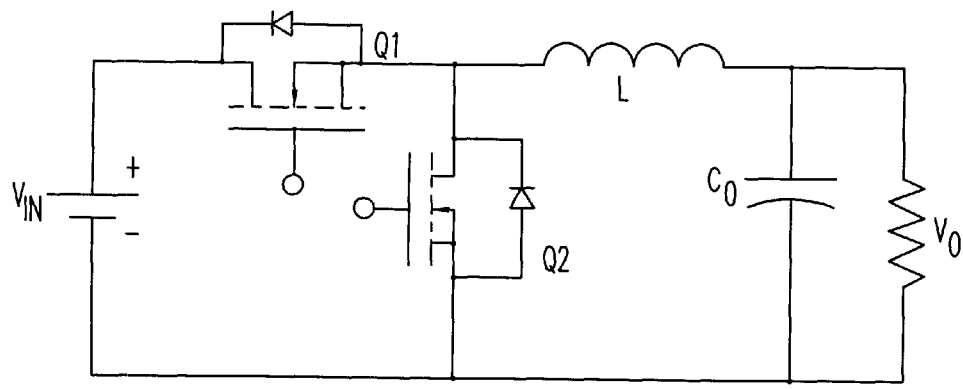
FIG. 1 is circuit diagram of a prior art synchronous rectifier buck converter.
Figure 2:
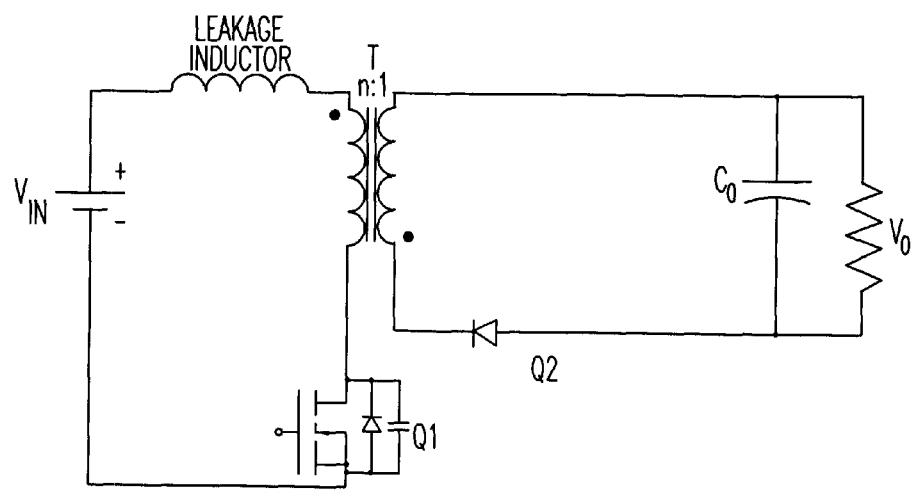
FIG. 2 is a circuit diagram of a prior art flyback converter.
Figure 3:
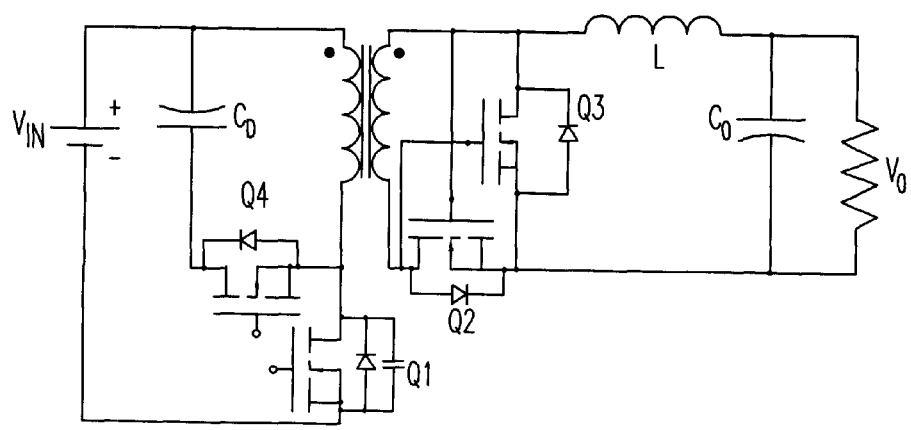
FIG. 3 is a circuit diagram of a prior art active clamp forward converter.
Figure 4:
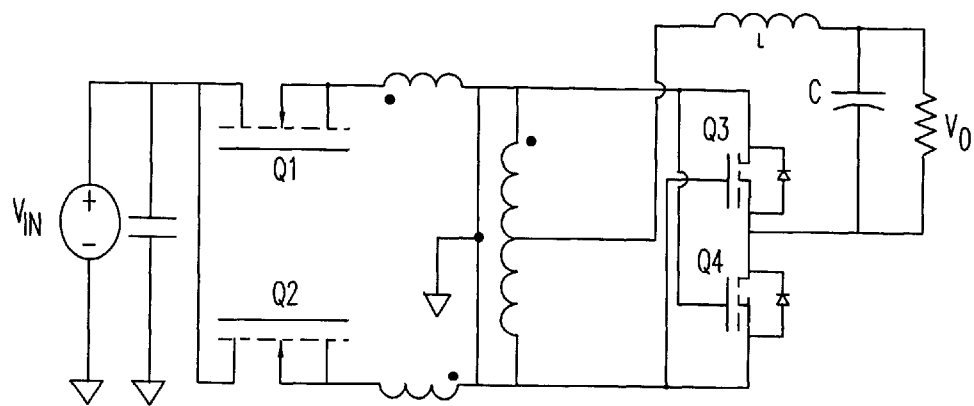
FIG. 4 is a circuit diagram of a push-pull converter with a center tapped secondary.

Referring now to the drawings, and more particularly to FIG. 7 there is shown the novel high input-voltage VRM topology—push pull forward converter according to the present invention. According to the invention, the primary side 10 comprises dual switches, S1 and S2, and transformer windings, T1 and T2, alternately connected in a loop with a capacitor C connected between any of two interleaved terminations. A voltage source Vin is connected between the switch S1 and the transformer T1. Similarly, a node between switch S2 and transformer T2 is connected to ground. The two primary windings, T1 and T2, have the same number of turns. The secondary side 20 comprises a current doubler structure. The secondary winding T3 connects to the terminations of two inductors, L1 and L2, and two synchronous switches, S3 and S4. The two inductors, L1 and L2, are connected together (point A). And the two switches are connected together (point B). The output is taken between points A and B.

Figure 9:
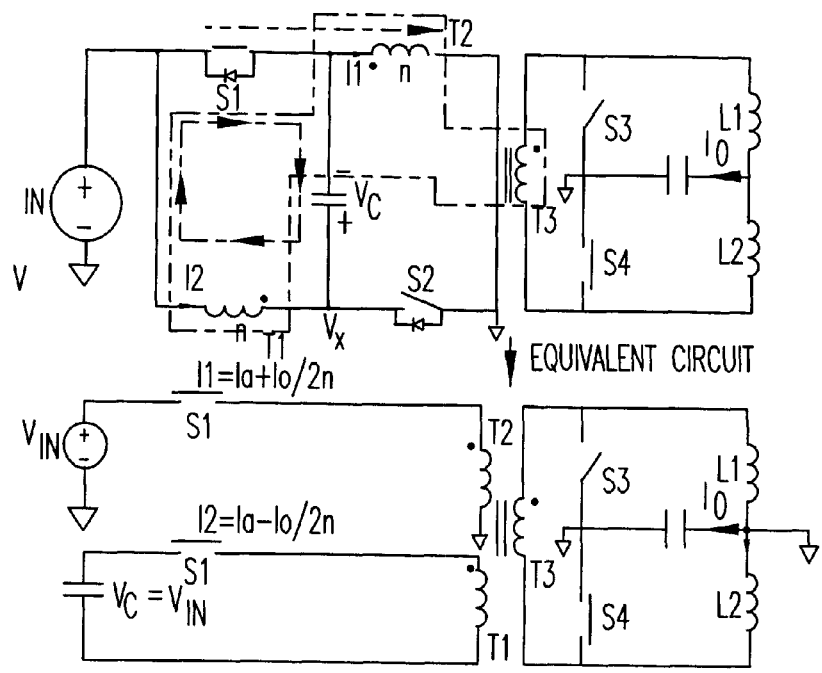
FIG. 9 is an equivalent circuit diagram of the push pull forward converter during operation from t1–t2.
Figure 10:
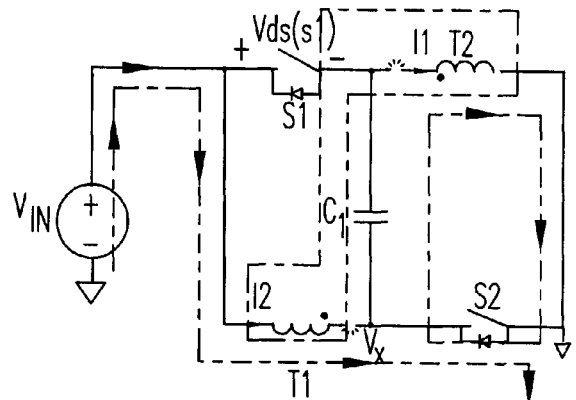
FIG. 10 is a is an equivalent circuit diagram of the push pull forward converter during operation from t2–t3.
Figure 11:
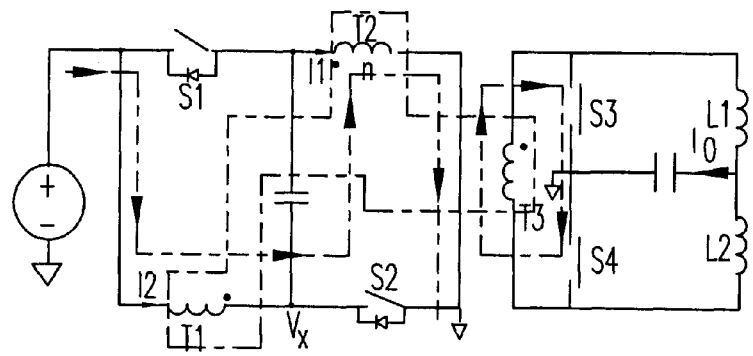
FIG. 11 is an equivalent circuit diagram of the push pull forward converter during operation from t3–t4.

FIG. 8 shows a timing diagram illustrating the operation of this converter at various time intervals taken with reference to FIGS. 9–11 which illustrate equivalent circuits at the various timing intervals. A controller 12, such as, for example a pulse width modulation (PWM) controller, may be used to operate the switches on the primary and secondary sides, 10 and 20.

Referring to FIG. 9, there is shown an equivalent circuit diagram for the converter at t1–t2. Switch S1 turns on and switch S2 turns off. The capacitor voltage Vc is equal to input voltage Vin. When S1 turns on, Vc is applied on winding T2. Input voltage is applied on winding T1. Actually, in this period, the push pull forward converter acts like two forward converters in parallel. FIG. 9 show the equivalent operation circuit.

The current in winding T1, I1 is equal to: $I1=Ia+Io/2^n+Imag/2$ (1)

The current in winding T2, I2 is equal to: $I2=Ia-Io/2^n-Imag/2$ (2)

The current in switch S1, Is1 is equal to: $Is1=Io/n+Imag$ (3)

The input current Iin is: $Iin=I1=Ia+Io/2^n+Imag/2$ (4)

Where Io is load current, Imag is magnetizing current. Ia is average leakage inductor current. From equation 4, the input current peak value is proportional to half load current, which mean its ripple peak is half of conventional VRMs'. As a result, its input filter can be reduced.

FIG. 10 shows an equivalent circuit diagram for the converter at t2–t3. In this period, the transformer leakage inductor current is discharged. From equation 1 and 2, during t1–t2, I1 is always larger than I2. After S1 turns off, since I1 is larger than I2, body diode of S2 is forced to turn on to continue the leakage inductor current. During this period, input voltage is applied to winding T2 to discharge leakage inductor current of winding T2, and Vc is applied to winding T1 to discharge leakage inductor current of winding T1. After the I1 and I2 reach the same value (Ia), this period ends. During the whole period, Vds of switch S1 is clamped to two time input voltages.

FIG. 11 shows an equivalent circuit diagram for the converter at t3–t4. In this period, both switch S1 and S2 are turned off. The leakage inductor current (Ia) is freewheeling in primary: input—winding T2—C—winding T1—ground. The magnetizing current is freewheeling in secondary winding T3. The voltage on the transformer winding is zero. When S2 turns on, the operation is symmetrical to that which happen during t1–t2. The voltage and current, which applied on winding T1 during t1–t2, now is applied on winding T2, and vice versa. After S2 turns off, the converter operation is symmetrical to that happened during t2–t4.

With regard to the secondary side of the converter 20, referring again to FIG. 9, during t1–t2, when S1 turns on, S4 turns and S3 turns off. Currents in L1 and L2 flow through secondary winding T3 and S4. The ripple of the current that flow through switch S4 is canceled. In FIG. 10, during t2–t3, after S1 turns off, the body diode of S2's turns on. At the same time, S4 turns off and S3 turns on. All the secondary currents flow through S3. In FIG. 11, during t3–t4, after the body diode of S2's turns off, both S3 and S4 turns on. Magnetizing current is freewheeling through secondary winding and S3 and S4. S3 and S4 allow the currents to continue flowing through L1 and L2. During t4–t1, the operation in secondary side is symmetrical to that during t1–t4.

Figure 5:
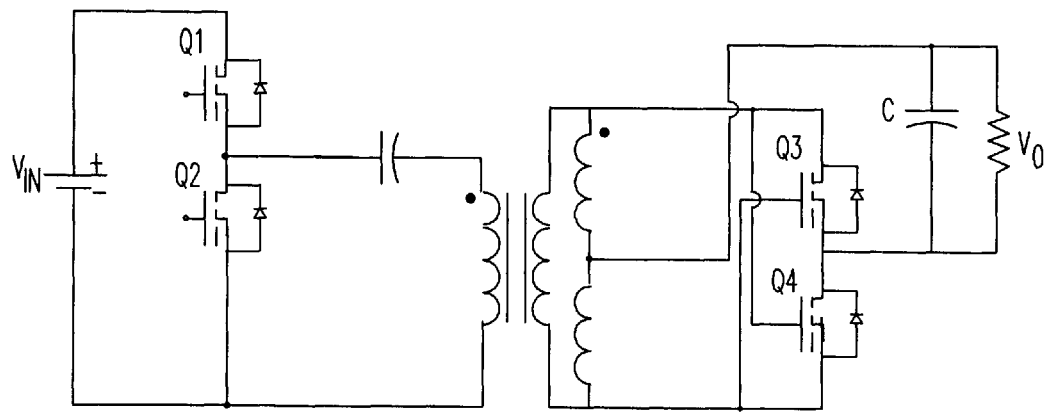
FIG. 5 is a circuit diagram of a prior art asymmetrical half bridge converter with a current doubler secondary.
Figure 6:
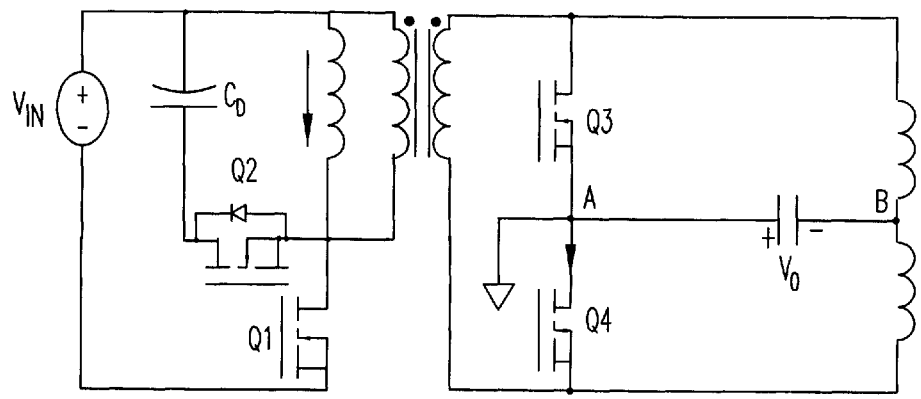
FIG. 6 is a circuit diagram of a prior art flyback forward converter.

Compared with asymmetrical half bridge as shown in FIG. 5 and the forward flyback shown in FIG. 6, both of which are fourth order systems, the push pull forward converter is a second order system. Therefore, its control is simple and its transient is fast. As a result, the output filter inductance and capacitance needed is reduced. Also due to its reduced input current ripple, its input filter can be reduced.

Figure 12:
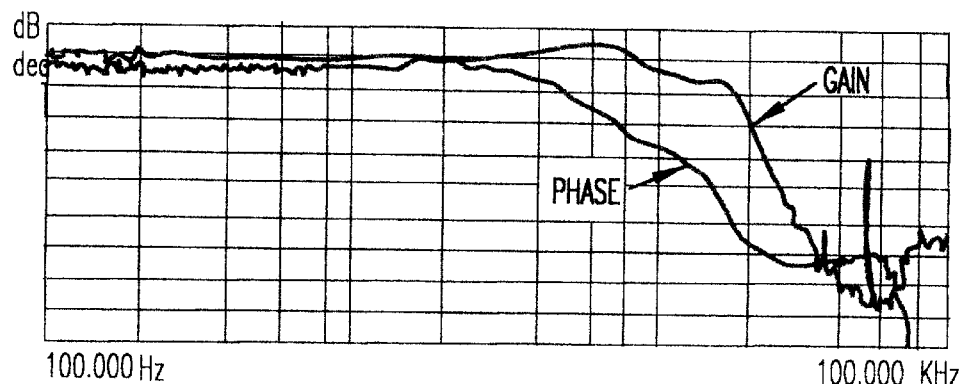
FIG. 12 is a graph showing open loop control to output body plot of the forward flyback converter shown in FIG. 6.

FIG. 12 shows open loop control to output body plot of forward flyback converter such as that shown in FIG. 6. This is a fourth order system. It is difficult to design its control compensator. As a result, the close loop bandwidth of this kind of converters is low. And their transient response is slow.

Figure 13:
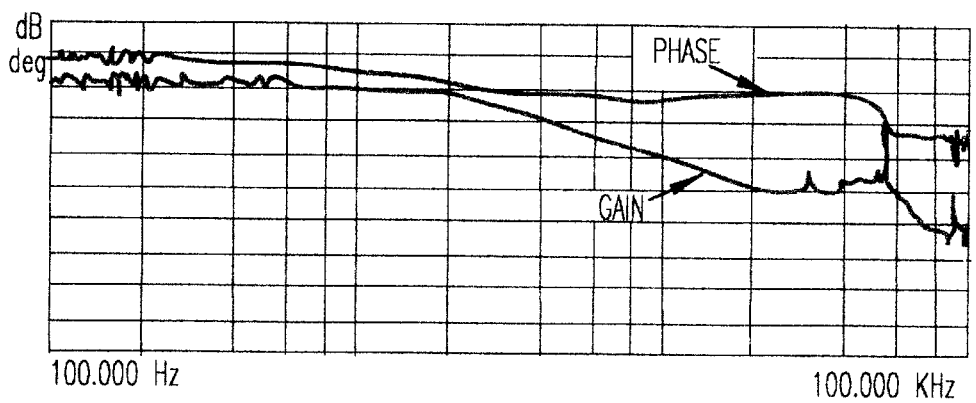
FIG. 13 is a graph showing open loop control to output body plot of the push pull forward converter according to the present invention.

FIG. 13 shows open loop control to output body plot of push pull forward converter according to the invention. This is a second order system. It's very easy to design its control compensator. Its close loop bandwidth can be very high and its transient response will be very fast.

Figure 14:
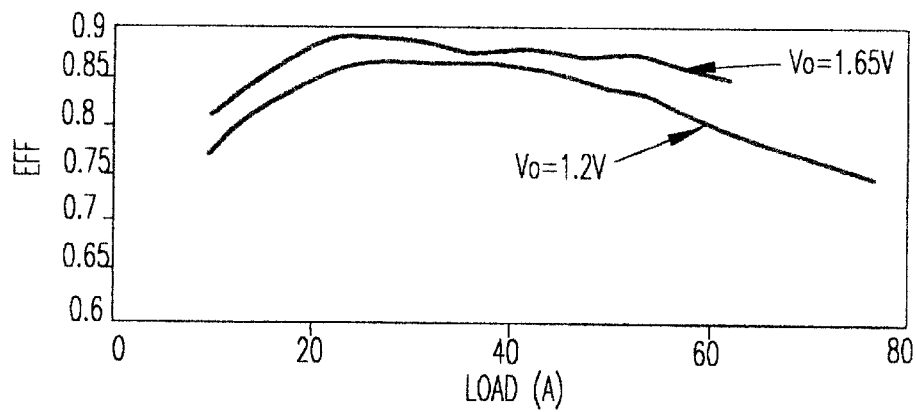
FIG. 14 is a graph showing efficiency of the push pull forward converter according to the present invention.
Figure 15:
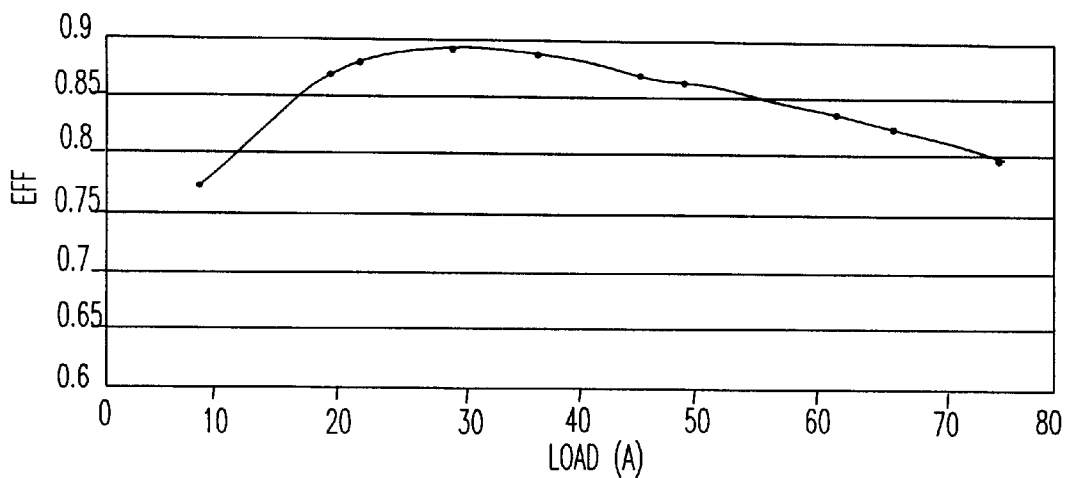
FIG. 15 is a graph showing efficiency of the push pull forward converter according to the present invention.
Figure 16:
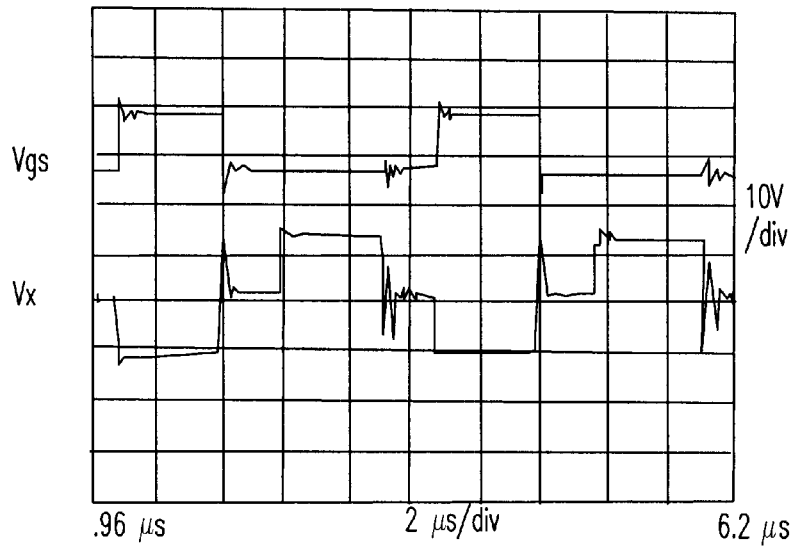
FIG. 16 is a graph showing the Vds waveform of the primary switch.

FIGS. 14 and 15 show the efficiencies of the push pull forward converter under 12 V and 48 V input voltage respectively. For 12 V input, it can achieve 81% efficiency at output 1.2 V at 60 A. For 48 V input, it can achieve 83.6% efficiency at output 1.2 V at 60 A. FIG. 16 shows the Vds waveform of the primary switches. The peak voltage is always clamped to two time input voltages.

Figure 17:
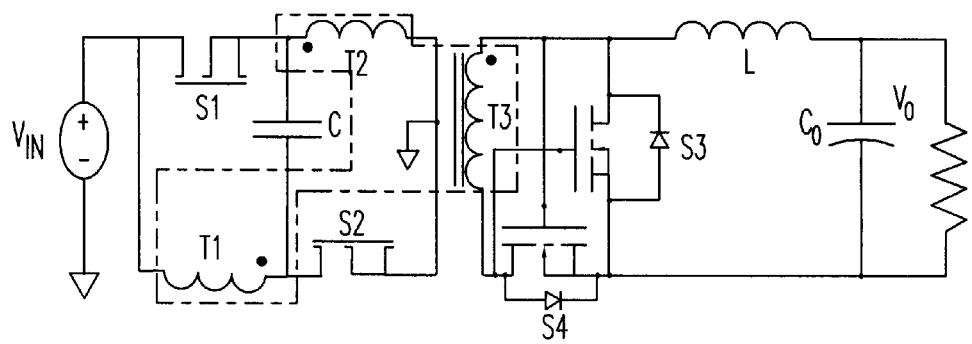
FIG. 17 is a circuit diagram showing the push pull forward converter of the present invention with a half wave rectifier.
Figure 18:
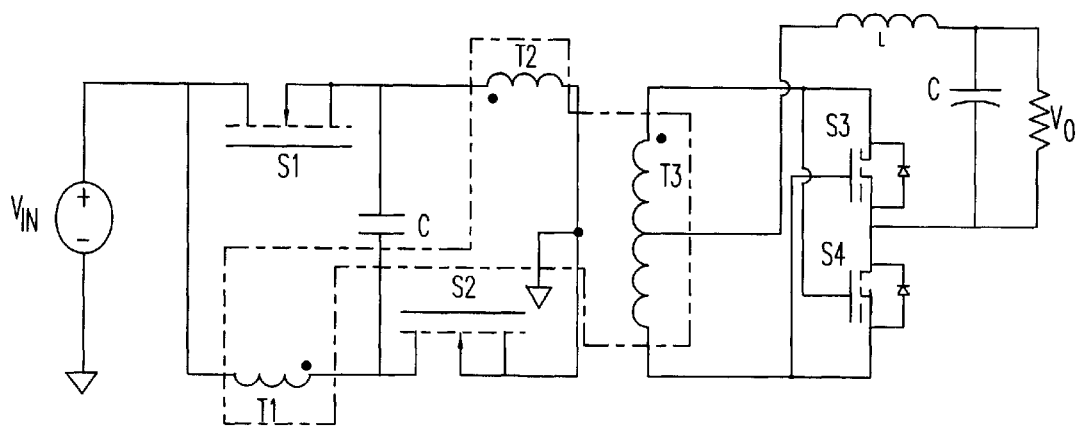
FIG. 18 is a circuit diagram showing the push pull forward converter of the present invention with a center tapped secondary.

The primary side topology 10, can use other secondary side topologies 20 known in the art. FIG. 17 and 18 show two examples. FIG. 17 shows a push pull forward with half wave rectifier. When S1 turns on, S4 turns on and S3 turns off. The energy is transferred from input to the output. When both S1 and S2 turns off, both S3 and S4 turns on. Magnetizing current is freewheeling through secondary winding and S3 and S4. S3 continues the inductor current. After S2 turns on, S3 turns on and S4 turns off. The magnetizing current is discharged in primary side. S3 continues the inductor current.

Similarly, FIG. 18 shows a push pull forward with center tapped secondary. When S1 turns on, S4 turns on and S3 turns off. The energy is transferred from input to output through the bottom side of secondary winding and S4. When S1 and S2 are turned off, both S3 and S4 are turned on. When S2 turns on and S1 turns off, S3 turns on and S4 turns off.

According to the invention, a high input voltage VRM topology can achieve high efficiency and fast transient response with small filter inductance and capacitance. Compared with conventional high voltage VRM topologies, both its inductance and capacitance can be reduced more than 2–4 times to meet the tight transient requirement. On the other hand, its transformer and inductors can be easily integrated. As a result, very high power density can be achieved. Also, compared with a conventional high input voltage VRM topologies, this voltage regulator module has high efficiency. And it is very cost effective.

While the invention has been described in terms of a single preferred embodiment, those skilled in the art will recognize that the invention can be practiced with modification within the spirit and scope of the appended claims.

We claim:

1. A voltage regulator module (VRM), for transforming a first DC voltage to a second DC voltage, comprising:
   a first switch;
   a first primary transformer coil;
   a second switch; and
   a second primary transformer coil, wherein said first switch, said first primary transformer coil, said second switch and said second primary transformer coil being alternately connected in a loop and being the only primary coils and switches in the VRM;
   a capacitor connected at a first node between said first switch and said second primary transformer coil and at a second node between said second switch and said first primary transformer coil, which discharges energy leakage from said first primary transformer coil and said second primary transformer coil to zero;
   a voltage source terminal connected between said first switch and said first primary transformer coil for inputting a first DC voltage; and
   a ground terminal connected between said second primary transformer coil and said second switch, wherein said first switch and said second switch open and close to charge and discharge said capacitor and energize said first and second primary transformer coils to induce a current in a secondary transformer coil for outputting a second DC voltage.

2. A voltage regulator module (VRM) as recited in claim 1 wherein said first switch and said second switch comprise MOS transistors.

3. A voltage regulator module (VRM) as recited in claim 1 wherein said first primary transformer coil and said second primary transformer coil comprise a same number of turns.

4. A voltage regulator module (VRM) as recited in claim 1 wherein said secondary transformer coil is connected to a current doubler.

5. A voltage regulator module (VRM) as recited in claim 1 wherein said secondary transformer coil is connected to a half wave rectifier.

6. A voltage regulator module (VRM) as recited in claim 1 wherein said secondary transformer coil comprises a center tapped secondary transformer coil.

7. A voltage regulator module (VRM) primary side, for transforming a first DC voltage to a second DC voltage at a secondary side, said primary side comprising:
   a first switch;
   a first primary transformer coil;
   a second switch; and
   a second primary transformer coil, said first switch, said first primary transformer coil, and said second switch and said second primary transformer coil being alternately connected in a loop and being the only coils and switches in the VRM;
   a capacitor connected at a first node between said first switch and said second primary transformer coil and at a second node between said second switch and said first primary transformer coil, which discharges energy leakage from said first primary transformer coil and said second primary transformer coil to zero;
   a voltage source terminal connected between said first switch and said first primary transformer coil for inputting a first DC voltage; and
   a ground terminal connected between said second primary transformer coil and said second switch.

8. A voltage regulator module (VRM) as recited in claim 7 wherein said first switch and said second switch comprise MOS transistors.

9. A voltage regulator module (VRM) as recited in claim 7 wherein said first primary transformer coil and said second primary transformer coil comprise a same number of turns.

10. A voltage regulator module (VRM) as recited in claim 7 further comprising a controller for operating said first switch and said second switch to open and close to charge and discharge said capacitor and energize said first and second primary transformer coils to induce a current in a secondary transformer coil for outputting a second DC voltage.

11. A two-switch converter having a two-primary transformer windings and a DC capacitor, which absorb primary winding energy leakage and transform to secondary windings, for transforming a first DC voltage to a second DC voltage, comprising:
   a direct current (DC) voltage source having a positive electrode and negative electrode;

a transformer having two primary windings and one or two secondary windings connected to the load, wherein said primary windings each having a first and second end and the second end of a first of said primary windings being connected to the positive electrode of the voltage source, the second end of a second of said primary windings being connected to the negative electrode of the voltage source;

the first switch connected between the positive electrode of the voltage source and the first end of a second of said primary windings and defining a first of said common nodes disposed between the first end of a second of said primary windings;

the second switch connected between the first end of a first of said primary windings and the negative electrode of the voltage source, and defining a second of said nodes disposed between the second switch and the first end of a first of said primary windings;

a capacitor connected between the first common node and the second common node.

* * * * *